May 5, 1959  J. W. STAFFORD  2,885,082
HORIZONTAL LEAF FILTER

Filed Aug. 31, 1954  4 Sheets-Sheet 2

INVENTOR
John W. Stafford
BY
Pollock, Johnston, Smythe & Robertson
ATTORNEYS

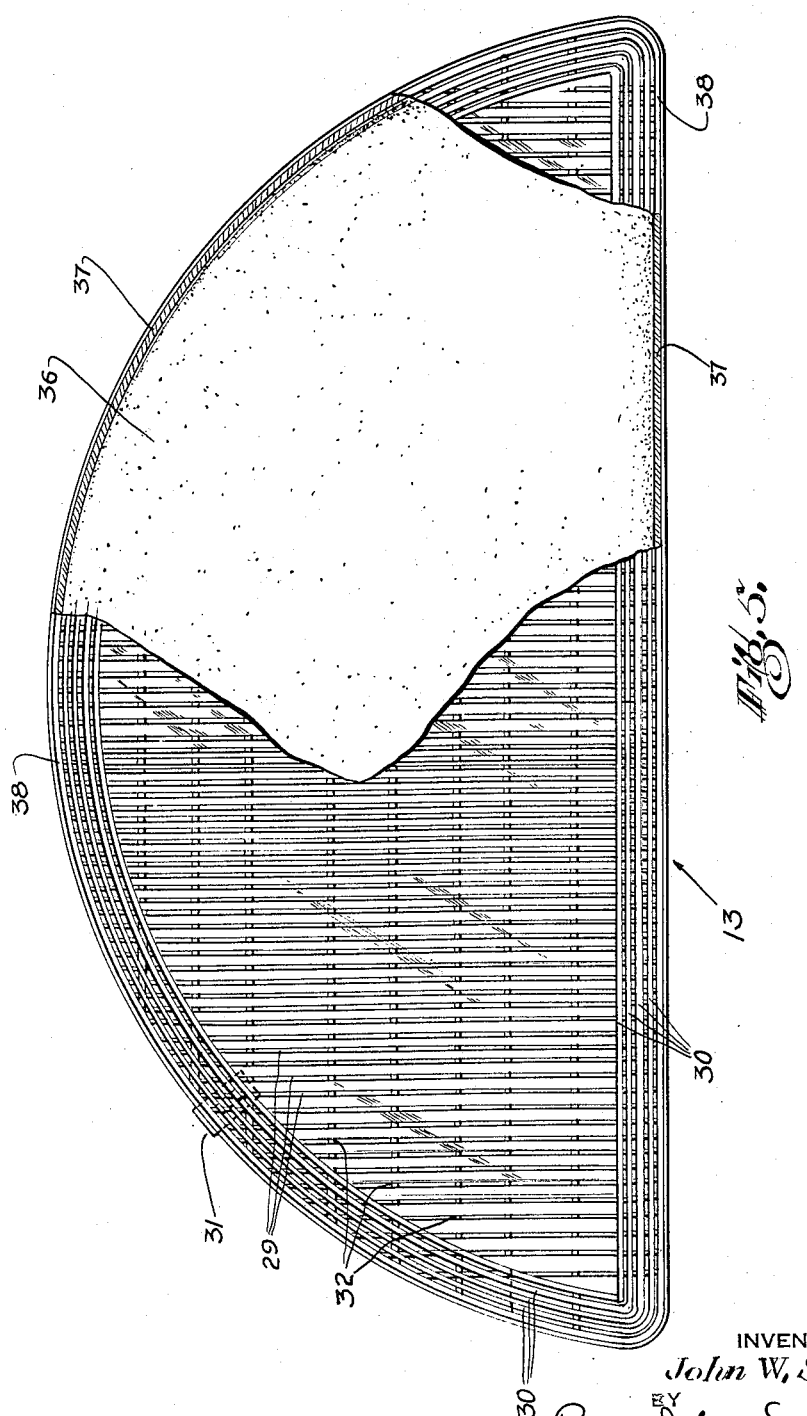

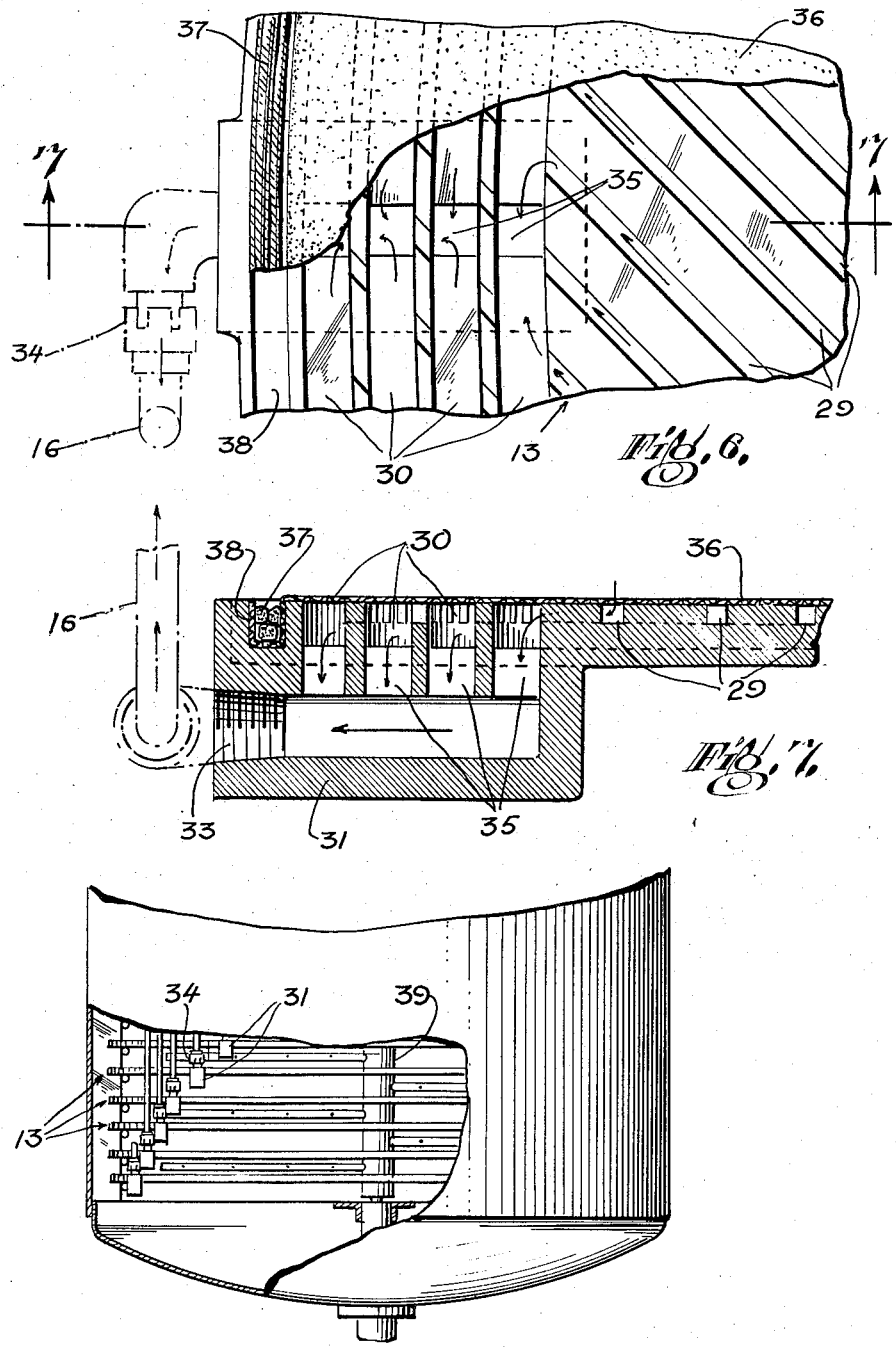

United States Patent Office 2,885,082
Patented May 5, 1959

2,885,082
HORIZONTAL LEAF FILTER

John W. Stafford, Hohokus, N.J., assignor to Fas-Flo Filter Corporation, New York, N.Y., a corporation of New York Application August 31, 1954, Serial No. 453,200

8 Claims. (Cl. 210—334)

This invention relates to a new and improved filter and more particularly to a multiple leaf filter having valuable uses for the filtration of sugar juices and other liquids.

A principal object of this invention is to provide a multiple leaf filter which can be operated according to the cycle of operation of known rotary leaf filters and which provides for the sluicing of the filter cake and for individual offtake of the filtrates from the respective leaves, but which is more economical and practical than such known filters in its construction and its features of operation.

Another object is to provide a multiple leaf filter adapted for operation under pressure, having an assembly of leaves with respect to supporting structures for the leaves and to a housing, whereby any leaf of the assembly can be conveniently removed and replaced in order to replace a faulty filter cloth, or for any other purpose, without disassembling the other leaves.

A more specific object is to provide a multiple leaf filter capable of maintaining even filtration through the many leaves and of sluicing the filter cake from the leaves at the end of each filtration cycle, wherein the leaves are stationary throughout the course of the filtration cycle.

A further object of this invention is to provide in a multiple leaf filter means enabling the direct observation of the filtrate from each leaf, thereby avoiding the use of sight glasses which are prone to become dirty and therefore of little value.

A filter constructed according to this invention includes a pressure casing or housing containing at least two spaced vertical tiers of horizontally disposed filter leaves which are spaced inwardly from the surrounding housing shell and which remain stationary in the operation of the filter. The tiers of filter leaves are supported in their proper spaced relationship in an assembly that may be movable into and from the housing as a unit. Each filter leaf preferably has the form of a sector of a circle, and the leaves of each tier are horizontally aligned with and spaced horizontally from the leaves of the other tier or tiers. While leaves of substantially semi-circular shape are preferred, other sector shapes such as quadrants or the like may be provided, especially in the case of extraordinarily large filters. Each filter leaf is provided with an individual filtrate pipe and is so related to the supporting means of the assembly and to the filtrate pipes that any leaf can be removed from and replaced in the assembly without dismantling the other leaves. Moreover, rotary sluicing means are provided for washing the filter cake from each leaf at the end of each filtration cycle, and the function of removal of the assembly from the housing or of the removal of individual leaves can be accomplished without dismantling the sluicing means.

The individual filtrate pipes for the filter extend from the arcuate edges of the respective leaves in a peripheral space between the leaf assembly and the surrounding shell of the housing, in which space the pipes can be led upwardly through the top of the housing to outlets or spouts so discharging over the top of the housing that an attendant can directly observe the quality of the filtrate from each leaf.

Other objects, features and advantages of this invention will be apparent from the following detailed description and the accompanying drawings of illustrative embodiments of the invention.

In the drawings:

Fig. 5 is a plan view of a preferred type of filter leaf, with part of the filter cloth broken away to reveal the construction at the surface of the leaf body;

Fig. 6 is an enlarged fragmentary plan view of a portion of the filter leaf at the region of its filtrate outlet;

Fig. 7 is a vertical cross-section taken along line 7—7 of Fig. 6; and

Fig. 8 is a fragmentary side elevation, with part of the housing broken away, illustrating a modified arrangement of filtrate pipes and filter leaf outlets.

Figure 1:
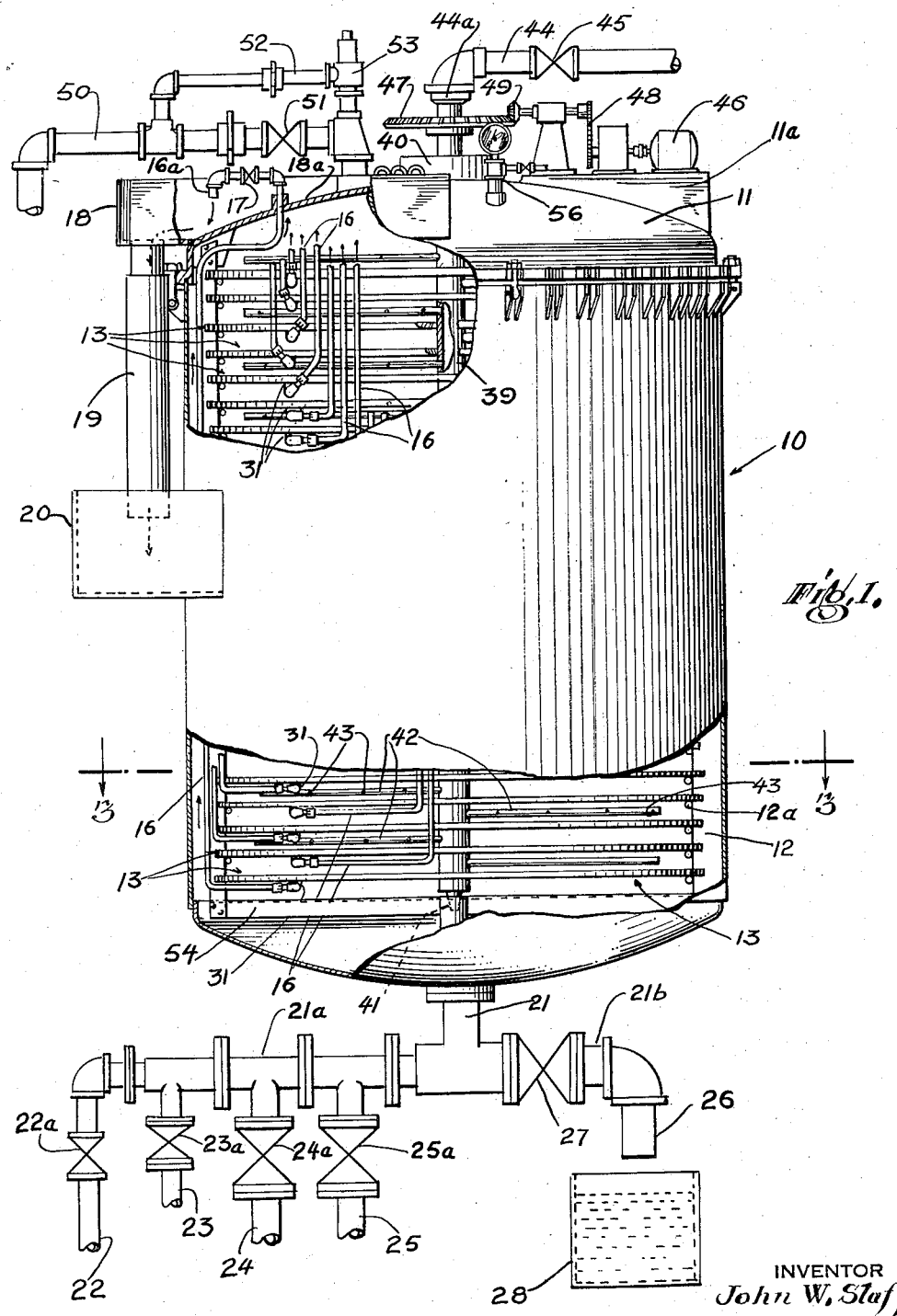
Fig. 1 is a side elevation of a preferred embodiment of the filter, some parts being broken away to reveal internal construction.

Referring first to Fig. 1 of the drawings, the new filter construction there shown includes an assembly of many individual filter leaves 13 disposed inside a cylindrical pressure casing of housing 10 having a removable cover 11 bolted thereto.

Figures 3, 4:
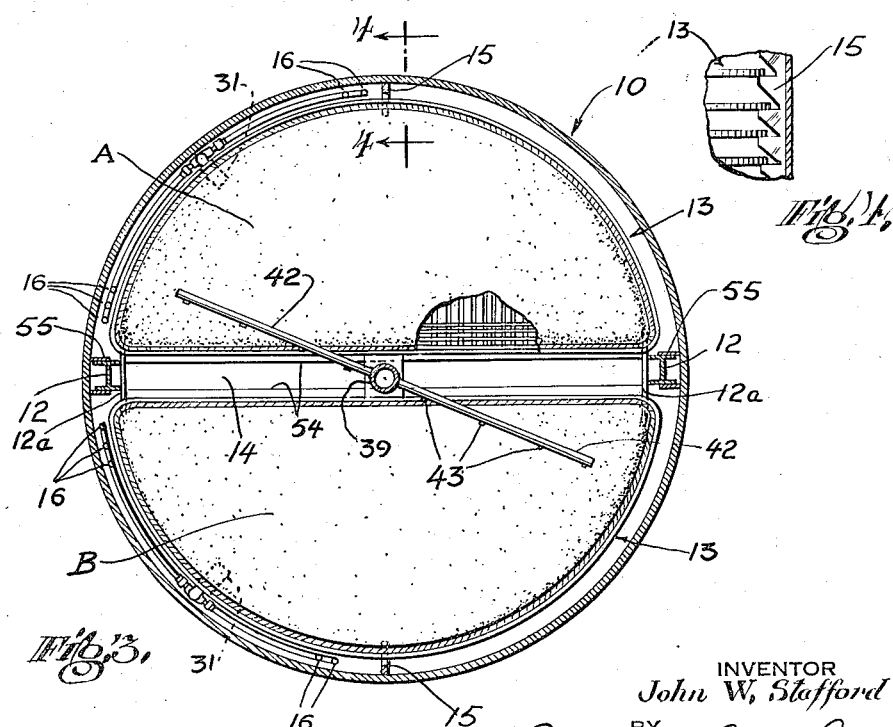
Fig. 3 is a horizontal cross-section on line 3—3 of Fig. 1.
Fig. 4 is a fragmentary vertical section showing a portion of one of the filter leaf supports, taken on line 4—4 of Fig. 3.

Suspended from suitable brackets on the underside of cover 11 are vertical supports 12 which form the principal support for the filter leaves. These supports can be H-beams, channel beams or any other suitable type of supporting member. The filter leaves 13 as here shown are substantially semi-circular in shape and are arranged in two tiers A and B, with a diametrical space 14 between the tiers, as shown in Fig. 3. The supports 12 are located at opposite ends of the space 14, and each support has a series of vertically spaced short support rods 12a secured thereto in position to support one end of each leaf of each tier. Guide members such as flanges 55 can be provided on the wall of housing 10 to locate and guide each or either of the supports 12 when the leaf assembly is moved into or out of the housing as hereinafter described.

Intermediate supports 15, which also are secured to the cover 11, are arranged inside the casing shell at peripheral locations spaced from the locations of supports 12, so as to support the outer edges of the individual leaves of each tier. The intermediate supports can be formed in the shape of a comb as shown in Fig. 4, or in other ways, for example, by securing a series of short horizontal support bars along a vertical channel beam. The cover 11 and the leaf supporting elements suspended therefrom, together with the tiers of leaves supported on those elements, constitute a leaf assembly that can be lifted out of the housing as a unit. Suitable structural members 54 interconnect the bottom ends of the supports 12 so as to keep them in proper alignment when the leaf assembly is out of the housing. Similar members can be used in conjunction with the supports 15.

The leaves 13 of each tier are spaced from the housing at their peripheries to provide an annular space around the leaf assembly between it and the shell of the housing. In this space, filtrate pipes 16 are detachably connected with the individual leaves 13 and extended away from them so as to conduct liquids away from the leaves. Above the topmost filter leaf the many filtrate pipes 16 are turned inwardly and then upwardly and are passed through the cover 11 in sealed relation thereto. Above the cover, the pipes terminate at open ends or spouts 16a which are spaced above the top surface of the cover and from which the liquids conducted through the respective pipes will fall freely to that surface in streams directly visible to an attendant of the filter. A valve 17 can be provided in each pipe 16 outside the housing to enable the attendant to put out of service any leaf that may fail to function satisfactorily, and thereby prevent contamination of a filtrate of desired quality with one not properly filtered. However, pipe plugs or any other suitable cutoff means can be used instead of the valves 17.

Figure 2:
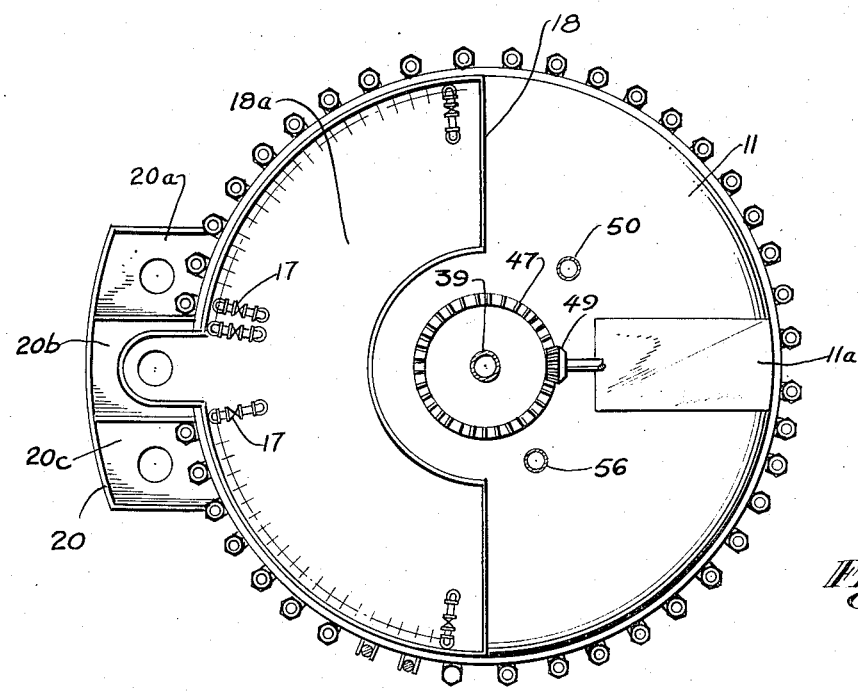
Fig. 2 is a top plan view of the filter housing with certain parts above the housing shown in section.

As seen in Figures 1, 2 and 3, the filtrate pipes from the leaves 13 of each tier are connected with the leaves and extend upwardly through the cover 11 within a single quadrant of the semi-circle described by the leaves. The quadrants occupied by the pipes from the leaves of the two tiers are located adjacent to each other. Thus, the many filtrate pipes 16 from all the leaves of the filter are disposed at one side of the housing; and the spouts 16a can be similarly disposed in a horizontal row arranged above the cover within an arc of 180°. Accordingly, the liquids discharged from the many spouts fall to a portion 18a of cover 11 at one side of the housing. In order to collect and carry away these liquids, an upstanding wall 18 is provided around cover portion 18a, forming with it a liquid receptacle on the top of the housing from which the collected liquid drains away through an outlet pipe 19. The outlet pipe 19 extends downwardly to a trough 20 having three compartments 20a, 20b and 20c, and pipe 19 is shiftable over this trough so as to direct the liquid flowing away from the filter into any selected one of the compartments. The separate compartments enable the separate disposition of the liquids discharged in different phases of the operating cycle of the filter.

The described quadrant arrangement of the filtrate pipes 16 with respect to the tiers of filter leaves has the important function of enabling the easy lateral removal of any of the filter leaves 13 from other parts of the leaf assembly. For example, the leaf assembly having been lifted out of the housing, or the housing shell itself having been suitably opened, leaves from either of the tiers A and B are removable by simply disconnecting the filtrate pipe of any selected leaf and sliding the leaf horizontally toward the right, as viewed in Fig. 3. It should be noted that the supports 12 and 15 are arranged so that they do not obstruct the lateral sliding movement of the leaves.

In order to effect the sluicing of filter cake from the leaves 13 at the end of each filtration cycle, a rotary vertical sluice pipe 39 is provided at or near the center of the leaf assembly in the space 14 between the tiers of leaves. The upper end of the sluice pipe is rotatably mounted in a bearing 40 on cover 11, and its lower end is mounted in a bearing 41. Suitable sealing means are provided in upper bearing 40 to prevent leakage of fluid under pressure therethrough.

Extending outwardly from the sluice pipe 39 at vertically spaced locations are radial spray arms 42, at least one of which extends over the filter leaves at each leaf level in the tiers of leaves. Each spray arm is fitted with spaced nozzles 43 designed to produce a fan-like spray that will cover, during rotation of the arm, the entire surface of both of the sector-shaped leaves with which it is associated.

Liquid for the sluicing operation, usually water, is supplied through pipe 44 connected with the upper end of the rotary sluice pipe above cover 11. Pipe 44 has a cut-off valve 45 to control the admission of the sluicing liquid. It also has a rotatable connection at 44a with the top of the sluice pipe 39. The sluice pipe is rotated during the sluicing process by suitable driving means which preferably are mounted on cover 11. As shown, a bevel ring gear 47 fixed to pipe 39 above cover 11 meshes with a driving pinion 49 which is rotated by motor 46 through suitable speed reduction gearing, including chain 48. The motor and reduction gearing are fixed to a support 11a on a part of the cover away from the liquid receptacle 18.

According to the embodiment illustrated in Figure 1, an inlet system for the admission of various fluids to the filter is provided at the botom of housing 10. However, it is to be understood that the inlet system could be on the side of the housing or at any other suitable location. A pipe 21 having two horizontal branches 21a and 21b forms the principal inlet to the housing. To branch 21a are connected supply pipes 22, 23, 24 and 25 which may be used, for example, for selectively supplying into the filter steam, hot water, a precoating composition and the liquid to be filtered, respectively. The supply pipes have cut-off valves 22a, 23a, 24a and 25a, respectively, for controlling the flow of fluid therethrough. The other branch 21b of pipe 21 has a cut-off valve 27 therein and extends to a drain 26 from which liquid can be discharged into a tank or offtake 28.

The filter leaves 13 can be constructed in various ways. In a particularly advantageous construction provided by this invention, as illustrated in Figs. 5, 6 and 7, each leaf has a substantially flat and semi-circular body of a suitably cast or molded metal or plastic composition, for example, of aluminum or of a synthetic resin resistant to the substances to be filtered. Numerous drainage grooves are formed in the top surface of each leaf, as depicted in Fig. 5. Most of the grooves consist of parallel cross grooves 29 of limited depth, each of which communicates at its ends with one or more of several peripheral grooves 30. The peripheral grooves extend entirely around the upper side of the leaf body near its peripheral edge. They are deeper than the cross grooves, and at a suitable location along the arcuate edge of the leaf they communicate through bottom openings 35 with a sump 31 formed in a lower part of the leaf body. Extending transverse to the grooves 29 are other parallel grooves 32 similarly formed in the surface of the leaf body and draining into the peripheral grooves 30. A filtrate pipe 16 is connected to a tapped exit opening 33 leading from the sump 31 of each leaf, preferably by means of a quickly disconnectable screw coupling 34 which enables any leaf to be quickly and easily separated from its respective filtrate pipe.

The filtering action of each filter leaf is brought about by a filter cloth 36 that overlies the leaf body. The filter cloth may be of cotton or any other suitable material. As indicated in Fig. 7, the ridges between the many grooves of the leaf body all terminate at a common height so that they form an evenly distributed though interrupted surface for supporting a filter cloth over the filtration grooves of the leaf.

The filter cloth is applied and held to the leaf body by laying it over the filtration grooves so that its marginal portions overlie a caulking groove 38 formed about the peripheral edge of the leaf body, and then forcing a rope gasket 37 or the like into the caulking groove 38 so that the rope will stretch the cloth and bind its marginal portions in groove 38.

Provisions are also made on cover 11 for the admission of compressed air to the housing, which is useful during the sluicing operation, for the admission of ambient air into the housing while draining liquid from the filter, and for the venting of air from the housing during the filling operation. As shown, vent pipe 50 extending to and through the cover has a valve 51 to control flow of air therethrough, and fitting 56 is provided in the cover for admitting compressed air when desired. A by-pass on pipe 50 by-passes valve 51 and is equipped with a safety valve 53 which is set to open if the pressure in housing 10 should become dangerously large.

A typical example of the operation of the described embodiment for the filtration of sugar juice is as follows:

The filter operating cycle in this example includes successive operations of warming the interior of the filter, pre-coating the leaves with a suitable filter aid, filtering the liquid to be clarified until the leaves are loaded with filter cake, washing residual matter from the cake, sluicing the cake from the leaves, and then resuming the pre-coating and filtering operations. In various uses of the filter, the warming operation may be omitted; and if the liquid to be filtered has a high percentage of suspended solids, no pre-coating step is used.

In the warming operation, all valves except valves 17 of the filtrate pipes being closed, the steam valve 22a is opened and steam thus is passed into and through the housing and the individual leaves therein until a desired temperature has been established. Then valve 22a is closed and valve 24a is opened to supply a liquid pre-coating composition into the filter. While filling the housing with this composition, the vent valve 51 is open to permit the escape of air from the housing. The pre-coating composition may be, for example, a suspension of diatomaceous earth in water or in previously filtered juice. It is supplied in an amount providing, for example, approximately 10 pounds of diatomaceous earth for every 100 square feet of filtration area. When the housing is filled with this liquid, the vent valve 51 is closed and then the pre-coating liquid is circulated and recirculated through the filter until the liquid seen at the spouts 16a becomes clear, indicating that the earth has been deposited upon the leaves. The recirculation is effected by delivering the liquid from outlet pipe 19 into a selected compartment of trough 20 and returning it from there through pipe 24.

The filter is now ready to enter the working phase of the cycle. Valve 24a is closed, and if previously filtered juice has been used as the pre-coating liquid, the housing need not be drained before admitting unfiltered liquor. The outlet pipe 19 is shifted to the filtrate compartment of trough 20, and the feed valve 25a then is opened to admit liquid to be filtered into the housing.

The filtration proceeds with liquid to be filtered entering the housing under pressure and the filtrates from the respective leaves flowing from the spouts 16a into the receptacle at the top of the housing. The pressure and flow rate of the liquid inside the housing are always substantially uniform, and since the filter leaves are horizontal and stationary, there is little or no likelihood of the filter cake on any leaf being displaced or falling off so as to impair the uniformity of the filtration. Since the inflow of liquid to be filtered passes under uniform pressure through the large annular space between the leaf assembly and the housing shell and also in the central space 14, there is an even distribution of liquid over the upper surfaces of the many leaves and little if any tendency for the liquid flow to displace the filter cake.

The filtration continues until the filter cake has accummulated to a thickness of, for example, between ¾ inch and 1¼ inches. When the desired final thickness is reached, the feed is stopped by closing valve 25a. Before removing the cake from the leaves, residual liquid in the filter is drained off and the cake is washed with hot water to recover the solutes contained in the cake. In order to drain off the residual liquid, drain valve 27 and vent valve 51 are opened. When the filter is thus emptied, the drain valve is closed and valve 23a is opened to fill the housing with hot water; whereupon vent valve 51 is closed and hot water is forced through the filter leaves and the filtrate pipes 16 to recover a solution of filter cake solutes known as "sweet water." During the discharge of sweet water, the outlet 19 is switched to a "sweet water" compartment of trough 20. When the desired end composition of the sweet water is reached, the vent and drain valves are reopened to drain off the residual water and to prepare for the sluicing operation.

Sluicing is now accomplished by opening valve 45 to admit water under pressure into the sluice pipe and energizing the driving means 46 of the sluice pipe so as to start rotation of this pipe. Water issues from the nozzles 43 in the form of a spray evenly distributed along the spray arms 42, and the rotation of the sluice pipe causes these arms to sweep slowly over the entire upper surfaces of the filter leaves. The rotating spray thus directed against the filter cake at each leaf level gradually erodes the cake away, and the slurry produced in this manner flows to the bottom of housing 10 and is drained off through pipe 26. Only a few revolutions of the sluice pipe suffices to remove the filter cake from the leaves. The filter cloth can be held flat against the upper surface of the leaves in the course of the sluicing operation, without being bellied up or displaced by the sluicing sprays, by admitting compressed air into the housing, for example, through inlet 56, while the sluicing takes place. The filtrate valves 17 being kept open, the compressed air passes through the filter leaves and holds the cloth 36 tightly against the ridges of the leaves.

When the sluicing operation is completed, the driving means of the sluice pipe is deenergized, the compressed air supply and the sluicing water supply are cut off, and the housing is drained. Then, the drain valve 27 is closed, and the filter is now ready for a new cycle of operation. In the new cycle, the warming step may be omitted.

Fig. 8 shows a modified arrangement of filtrate pipes in a filter otherwise conforming with the embodiment of Figs. 1 to 7. According to this modification, the filter leaves of each tier of leaves have their respective liquid offtakes located at different points along the arcuate outer edges of the leaves. In this way, each liquid offtake is offset horizontally from the others, and the filtrate pipes connected with the respective offtakes can be arranged in a parallel pattern extending upwardly in the space between the leaf assembly and the shell of the housing.

In the event that the filter is to be installed in a location in which headroom is limited, it may be desirable to provide a split filter housing that opens at the side to give access to and permit removal of any of the filter leaves without lifting the leaf assembly out of the housing. For example, the housing may be constructed with two or more separable shell portions at least one of which can be moved laterally away from the other or others so as to provide a lateral opening in the housing adjacent to each tier of leaves and of a width exceeding the breadth of the leaves.

It will be understood that the new features herein disclosed and set forth in the appended claims may be employed in ways and forms different from those in the preferred embodiments described above and illustrated in the drawings, without departing from the contributions of this invention.

What is claimed is:

1. In a multiple-leaf filter, a housing including a vertically elongated shell normally closed to receive liquid under pressure, a multiplicity of filter leaves each having means over its upper side for filtering liquid therethrough and for holding solids thereon, means for supporting said leaves within said housing in fixed horizontal and vertically spaced positions in which they form at least two vertical tiers of leaves spaced apart horizontally and spaced inwardly from said shell, and means within said housing for directing liquid over each of said leaves to sluice solids from its filtering surface into the spaces between said tiers and between them and said shell, the last recited means comprising a rotary pipe extending vertically in space between said tiers and a sluice arm extending laterally from said pipe to rotate over the leaves at each level of said tiers.

2. In a multiple-leaf filter, a housing including a vertically elongated shell normally closed to receive liquid under pressure, a multiplicity of filter leaves each having means over its upper side for filtering liquid therethrough and for holding solids thereon, means for supporting said leaves within said housing in fixed horizontal and vertically spaced positions in which they form at least two vertical tiers of leaves spaced apart horizontally and spaced inwardly from said shell, means within said housing for directing liquid over each of said leaves to sluice solids from its filtering surface into the spaces between said tiers and between them and said shell, and an individual filtrate pipe connected with each of said leaves and extending from it to a location outside said housing.

3. In a multiple-leaf filter, a housing including a vertically elongated shell normally closed to receive liquid under pressure, a multiplicity of filter leaves each having means over its upper side for filtering liquid therethrough and for holding solids thereon, means for supporting said leaves within said housing in fixed horizontal and vertically spaced positions in which they form at least two vertical tiers of leaves spaced apart horizontally and spaced inwardly from said shell, said supporting means providing for each of said leaves at least three horizontally spaced points of peripheral support so located that each leaf is slidable horizontally out of its tier without obstruction by its supports or the other leaves when said shell is removed from its path of movement.

4. In a multiple-leaf filter, a housing including an upright cylindrical shell normally closed to receive liquid under pressure, a multiplicity of filter leaves each shaped as a substantially chordal segment of a circle and having means over its upper side for filtering liquid therethrough and for holding solids thereon, means for supporting said leaves within said housing in fixed horizontal and vertically spaced positions in which they form two vertical tiers of leaves spaced apart along a plane diametrical to said shell and spaced inwardly from said shell, and sluicing means extending vertically through the space between said tiers and comprising vertically spaced elements for directing fluid over the filtering surfaces of the leaves at each level of said tiers to sluice solids from said surfaces into the space between said tiers and the space between them and said shell.

5. In a multiple-leaf filter, a housing including an upright cylindrical shell normally closed to receive liquid under pressure, a multiplicity of filter leaves each shaped as a substantially chordal segment of a circle and having means over its upper side for filtering liquid therethrough and for holding solids thereon, means for supporting said leaves within said housing in fixed horizontal and vertically spaced positions in which they form two vertical tiers of leaves spaced apart along a plane diametrical to said shell and spaced inwardly from said shell, and sluicing means extending vertically through the space between said tiers and comprising vertically spaced elements for directing fluid over the filtering surfaces of the leaves at each level of said tiers to sluice solids from said surfaces into the spaces between said tiers and between them and said shell, said supporting means comprising a plurality of supports extending vertically through the space within said shell and vertically spaced elements on said supports for holding said leaves securely in said positions yet over which each leaf is slidable horizontally out of its tier without obstruction by said supporting means or said sluicing means when said shell is removed from its path of movement.

6. In a multiple-leaf filter, a housing including an upright cylindrical shell normally closed to receive liquid under pressure, a multiplicity of filter leaves each shaped as a substantially chordal segment of a circle and having means over its upper side for filtering liquid therethrough and for holding solids thereon, means for supporting said leaves within said housing in fixed horizontal and vertically spaced positions in which they form two vertical tiers of leaves spaced apart along a plane diametrical to said shell and spaced inwardly from said shell, and sluicing means extending vertically through the space between said tiers and comprising vertically spaced elements for directing fluid over the filtering surfaces of the leaves at each level of said tiers to sluice solids from said surfaces into the spaces between said tiers and between them and said shell, and an individual filtrate pipe separably connected with a peripheral part of each leaf and extending from it to a location outside said housing, said supporting means comprising a plurality of supports extending vertically through the space within said shell and vertically spaced elements on said supports for holding said leaves securely in said positions yet over which each leaf is slidable horizontally out of its tier without obstruction by said supporting means or said sluicing means when said shell is removed from its path of movement and it is disconnected from its filtrate pipe.

7. In a multiple-leaf filter, a housing including an upright cylindrical shell normally closed to receive liquid under pressure, a multiplicity of filter leaves each shaped as a substantially chordal segment of a circle and having means over its upper side for filtering liquid therethrough and for holding solids thereon, means for supporting said leaves within said housing in fixed horizontal and vertically spaced positions in which they form two vertical tiers of leaves spaced apart along a plane diametrical to said shell and spaced inwardly from said shell, and sluicing means extending vertically through the space between said tiers and comprising vertically spaced elements for directing fluid over the filtering surfaces of the leaves at each level of said tiers to sluice solids from said surfaces into the spaces between said tiers and between them and said shell, said supporting means comprising a plurality of supports extending vertically through the space within said shell and vertically spaced elements on said supports for holding said leaves securely in said positions yet over which each leaf is slidable horizontally out of its tier without obstruction by said supporting means or said sluicing means when said shell is removed from its path of movement, said housing comprising an end closure separably connected with said shell and said supports and said sluicing means being mounted in fixed positions on said end closure.

8. In a multiple-leaf filter, a housing comprising an upright cylindrical shell normally closed to receive liquid under pressure and an end closure separably connected with said shell, a plurality of supports fixed to said end closure and extending from it vertically through the space within said shell, said supports being spaced apart horizontally and disposed near said shell, a multiplicity of filter leaves each shaped as a substantially chordal segment of a circle and having means over its upper side for filtering liquid therethrough and holding solids thereon, means on said supports for holding said leaves between said supports in horizontal and vertically spaced positions in which they form vertical tiers of leaves spaced apart along a plane diametrical to said shell and spaced inwardly from said shell, an individual filtrate pipe separably connected to each of said leaves and extending from it to a location outside said housing, and sluicing means including a rotary pipe extending vertically in the space between said tiers and a pipe arm extending laterally from said rotary pipe over the filtering surfaces of the leaves at each level of said tiers, said end closure holding said sluicing means and said supports with said leaves thereon in a fixed assembly, said holding means providing for each of said leaves at least three spaced points of peripheral support so located that each leaf is slidable horizontally out of its tier without obstruction by other elements of said assembly when said shell and said end closure are separated and the leaf is disconnected from its filtrate pipe.

References Cited in the file of this patent

UNITED STATES PATENTS

| | | |
|---|---|---|
| 1,227,982 | Vallez | May 2, 1917 |
| 1,292,342 | McGlaughlin | Jan. 21, 1919 |
| 1,343,182 | Sweetland | June 8, 1920 |
| 1,412,557 | Fleetwood | Apr. 11, 1922 |
| 1,438,797 | Vachier | Dec. 12, 1922 |
| 1,510,568 | Sweetland | Oct. 7, 1924 |
| 1,818,623 | Holcomb et al. | Aug. 11, 1931 |
| 2,255,205 | Chamouton | Sept. 9, 1941 |
| 2,609,101 | Howland et al. | Sept. 2, 1952 |
| 2,651,418 | Prendergast | Sept. 8, 1953 |